(12) United States Patent
Yamada et al.

(10) Patent No.: US 7,538,075 B2
(45) Date of Patent: May 26, 2009

(54) HEAT-DISSIPATING SILICONE GREASE COMPOSITION

(75) Inventors: Kunihiro Yamada, Gunma (JP); Hiroaki Tetsuka, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 699 days.

(21) Appl. No.: 10/996,418

(22) Filed: Nov. 26, 2004

(65) Prior Publication Data

US 2005/0110133 A1 May 26, 2005

(30) Foreign Application Priority Data

Nov. 25, 2003 (JP) ............................. 2003-393417

(51) Int. Cl.
*C10M 169/04* (2006.01)

(52) U.S. Cl. ..................................... 508/208

(58) Field of Classification Search ................. 508/208, 508/584, 563
See application file for complete search history.

(56) References Cited

U.S. PATENT DOCUMENTS 6,255,257 B1 7/2001 Yamada et al.

2002/0014692 A1 2/2002 Yamada et al.
2006/0252655 A1* 11/2006 Iso et al. ..................... 508/154

FOREIGN PATENT DOCUMENTS

| DE | 283312 A3 | 10/1990 |
|---|---|---|
| EP | 1188810 A2 | 3/2002 |
| EP | 1352947 A1 | 10/2003 |
| JP | 06-15766 U | 3/1994 |
| JP | 2003-168/772 A | 6/2003 |

* cited by examiner

*Primary Examiner*—Walter D Griffin
*Assistant Examiner*—Frank C Campanell
(74) *Attorney, Agent, or Firm*—Millen, White, Zelano, Branigan, P.C.

(57) ABSTRACT

A heat dissipating silicone grease composition comprising: (A) 3% to 30% by weight of an organo polysiloxane represented by the general formula, $R^1_a SiO_{(4-a)/2}$ ($R^1$ is one or two or more groups selected from a group of saturated or unsaturated monovalent hydrocarbon groups containing one to eighteen carbon atoms, and a is a positive number defined by $1.8 \leq a \leq 2.2$) having a dynamic viscosity at 25° C. of 50 $mm^2/s$ to 500,000 $mm^2/s$; (B) 60% to 96.9% by weight of a thermally conductive filler having a thermal conductivity of at least 10 W/(m·K); and (C) 0.1% to 10% by weight of a solvent that disperses or dissolves component (A).

15 Claims, No Drawings

HEAT-DISSIPATING SILICONE GREASE COMPOSITION

BACKGROUND OF THE INVENTION

1. Field of the Invention

The present invention relates to a heat dissipating silicone grease composition, preferably the invention relates to a heat dissipating silicone grease composition having excellent coating properties.

2. Description of the Prior Art

Electrical and electronic parts generally generate heat, and the heat needs to be removed for electrical parts to function properly. A variety of heat dissipating thermally conductive materials have been proposed, and they are available in two forms: (1) sheets that are easy to handle and (2) pastes commonly referred to as heat dissipating greases.

The heat dissipating greases mentioned above offer the advantages of being able to fill irregular surfaces and crevices in electronic parts and enlarging the contact area between electronic parts and the heat dissipating materials. However, the heat dissipating greases are difficult to handle and are ordinarily used after packing them into dispensing device syringes. In addition, the use of a printing process referred to as a metal screen or stencil printing process can efficiently and accurately apply a heat dissipating grease when the grease is to be coated on a relatively large area such as a heat sink. Various types of silicone greases have been developed to be used as such heat dissipating greases. (For example, see Unexamined Japanese Patent Publication No. 2000-63872, No. 2000-63873, No. 2000-109373, No. 2000-114438, No. 2000-129160, No. 2003-301189.)

However, the printing process described above involves an application of a heat dissipating grease on a heat sink and the like by spreading it using a squeegee and the like on a metal sheet made of stainless steel and the like cut into a desired shape. And a problem is that the grease is difficult to apply when the heat dissipating grease is highly viscous. The problem is particularly severe when the amount of a thermally conductive filler in a heat dissipating grease needs to be increased to improve the thermal conductivity of the heat dissipating grease and the viscosity rises due to the increase of the filler. Therefore, the development of a heat dissipating silicone grease composition having excellent thermal conductivity that can be applied on metal screens and the like using a printing process is urgently needed.

SUMMARY OF THE INVENTION

Therefore, the object of the present invention is to provide a heat dissipating silicone grease composition having excellent thermal conductivity and coating properties.

The inventors extensively researched the problem, and as a result, the inventors found that the problems mentioned above could be solved without a deterioration in the coating properties even when the amount of thermally conductive filler added was increased by adding an organo polysiloxane having a designated dynamic viscosity and a solvent in a designated amount.

That is, a heat dissipating silicone grease composition of the present invention comprising:

(A) 3% to 30% by weight of an organo polysiloxane represented by the general formula, $$R^1_a SiO_{(4-a)/2}$$

($R^1$ is one or two or more groups selected from a group of saturated or unsaturated monovalent hydrocarbon groups containing one to eighteen carbon atoms, and a is a positive number defined by $1.8 \leq a \leq 2.2$) having a dynamic viscosity at 25° C. of 50 mm²/s to 500,000 mm²/s;

(B) 60% to 96.9% by weight of a thermally conductive filler having a thermal conductivity of at least 10 W/(m·K); and (C) 0.1% to 10% by weight of a solvent that disperses or dissolves said component (A).

Furthermore, it is preferable that the heat dissipating silicone grease composition contains 0.1 part to 10 parts by weight of (D) an organosilane or its partially hydrolyzed condensed material represented by the general formula $$R^2_b R^3_c Si(OR^4)_{4-b-c}$$

($R^2$ is one or two or more groups selected from a group of substituted or unsubstituted monovalent alkyl groups containing six to twenty carbon atoms, $R^3$ is one or two or more groups selected from a group of substituted or unsubstituted monovalent hydrocarbon groups containing one to twenty carbon atoms, $R^4$ is one or two or more groups selected from a group of monovalent alkyl groups containing one to six carbon atoms, b is an integer from one to three, c is an integer from zero to two and b+c is an integer from one to three) per a total of 100 parts by weight of said components (A), (B) and (C). In addition, it is preferable that said component (C) being an isoparaffin type solvent having a boiling point of 80° C. to 260° C.

A method of using the heat dissipating silicone grease composition of the present invention comprising the steps of: applying said heat dissipating silicone grease composition to the surface of a heat dissipating material using a printing process; and evaporating subsequently said solvent contained in said composition.

DETAILED DESCRIPTION OF THE INVENTION

The embodiment of the present invention is explained below. The essential components of the present invention are an organo polysiloxane having a designated dynamic viscosity as component (A), a thermally conductive filler as component (B) and a solvent for component (A) as component (C).

1. Component (A).

The organo polysiloxane of component (A) is represented by the general formula (1).

$$R^1_a SiO_{(4-a)/2}.$$

Here, $R^1$ is one or two or more groups selected from a group of saturated or unsaturated monovalent hydrocarbon groups containing one to eighteen carbon atoms. As such groups, alkyl groups such as methyl, ethyl, propyl, hexyl, octyl, decyl, dodecyl, tetradecyl, hexadecyl, and octadecyl groups; cycloalkyl groups such as cyclopentyl and cyclohexyl groups; alkenyl groups such as vinyl and allyl groups; aryl groups such as phenyl and tolyl groups; aralkyl groups such as 2-phenylethyl and 2-methyl-2-phenylethyl groups; and halogenated hydrocarbon groups such as 3,3,3-trifluoropropyl, 2-(perfluorobutyl) ethyl, 2-(perfluorooctyl) ethyl and p-chlorophenyl groups can be mentioned, but the methyl group, phenyl group and alkyl groups containing six to fourteen carbon atoms are particularly preferred.

a is a positive number defined by $1.8 \leq a \leq 2.2$, and a positive number between 1.9 and 2.2 is particularly preferred.

The dynamic viscosity at 25° C. (degree C.) for the organo polysiloxane mentioned above is 50 mm²/sec to 500,000 mm²/sec. When the dynamic viscosity is less than 50 mm²/sec, oil tends to bleed when it is used in a silicone grease composition. When the dynamic viscosity exceeds 500,000 mm²/sec, a silicone grease composition thereof has poor extension properties (stretch). The dynamic viscosity of the organo polysiloxane mentioned above of 100 mm²/sec to 10,000 mm²/sec is particularly preferred.

The content of the organo polysiloxane described above is 3% to 30% by weight of the entire silicone grease composition, but 5% to 15% by weight is preferred. When the content is less than 3% by weight, the composition does not form a grease and has poor extension properties. When the content exceeds 30% by weight, the thermal conductivity declines.

2. Component (B).

The thermally conductive filler of component (B) needs to have a thermal conductivity of at least 10 W/(m·K). When the thermal conductivity is less than 10 W/(m·K), the thermal conductivity of the silicone grease composition itself declines. The upper limit for the thermal conductivity varies according to the material used in the thermally conductive filler, but the upper limit is not particularly restricted. Powders and granular materials such as aluminum powder, copper powder, silver powder, nickel powder, gold powder, alumina powder, zinc oxide powder, magnesium oxide powder, aluminum nitride powder, boron nitride powder, silicon nitride powder, diamond powder, carbon powder and the like, for example, can be mentioned as the thermally conductive filler. One of these or mixtures of at least two of these may be used.

When a powder or a granular material is used as the thermally conductive filler, its shape may be amorphous or spherical or any shape. However, those having an average particle size of 0.1 µm to 100 µm are preferred. When the average particle size is less than 0.1 µm the composition may not form a grease and may have poor extension properties. When the average particle size exceeds 100 µm, the uniformity of the composition tends to become inferior.

The content of the thermally conductive filler described above is 60% to 96.9% by weight of the entire silicone grease composition, and 80% to 95% by weight is preferred. When the content is less than 60% by weight, the needed thermal conductivity is not attained. When the content exceeds 96.9% by weight, the composition does not form a grease and has poor extension properties.

3. Component C.

The solvent used as component (C) is not particularly restricted as long as it disperse or dissolves said component (A), and toluene, xylene, acetone, methylethyl ketone, cyclohexane, n-hexane, n-heptane, butanol, IPA, isoparaffin and the like, for example, may be mentioned. Isoparaffin type solvents having a boiling point of 80° C. to 260° C. are preferred particularly from the printing processing stand point. When the boiling point of an isoparaffin type solvent is below 80° C. evaporation is too fast and the inconvenience of rising composition viscosity during printing may be encountered. Also, when the boiling point exceeds 260° C. the solvent tends to remain in the silicone grease composition and thermal properties tends to decline due, for example, to void formation.

The content of the solvent described above is 0.1% to 10% by weight of the entire silicone grease composition, and 0.5% to 5% by weight is preferred. When the content is less than 0.1% by weight, the solvent cannot adequately lower the viscosity of the silicone grease composition. When the content exceeds 10% by weight, the composition does not form a grease and has poor extension properties.

The thermal conductivity of a heat dissipating silicone grease composition basically correlates to the content of thermally conductive filler, and the thermal conductivity improves further when the content of thermally conductive filler is increased. However, the content of thermally conductive filler must be limited when taking processing properties, handling and the like into consideration since the viscosity of a heat dissipating silicone grease composition itself rises when a large amount of a thermally conductive filler is added. Therefore, the addition of a small amount of component (C) can suddenly decrease the viscosity of a heat dissipating silicone grease composition to achieve good processing and handling properties even when the content of thermally conductive filler is greater than that of previous compositions.

As far as the method of using the heat dissipating silicone grease composition of the present invention is concerned, a method comprising the steps of; applying a thin coating of the heat dissipating silicone grease composition of the present invention to the surface (a top side and the like) of a heat dissipating material (a heat sink and the like) using a printing process involving a metal screen and the like, and evaporating the involved solvent subsequently at ambient temperature or upon aggressive heating may be mentioned. As the condition used to evaporate a solvent, a drying process extending for at least five minutes at a temperature between ambient temperature to 120° C. is preferred. When the temperature is below ambient temperature, the solvent may be difficult to evaporate and the drying time tends to become extended. When the temperature exceeds 120° C., the drying time is short but the safety is a concern during handling. A drying process lasting ten minutes to 600 minutes is preferred. A drying process conducted at 50° C. to 80° C. for ten minutes to 180 minutes is more preferred.

Allowing the solvent in a composition to evaporate using a drying process and the like in the manner described above is important in eliminating the inconvenience of having the thermal resistance rise due to the voids generated by the residual solvent in a composition. For example, the thermal resistance rises and the heat dissipating effect declines, for example, when voids remain in a composition due to inadequate drying.

The components (A) through (C) mentioned above are essential components of a heat dissipating silicone grease composition of the present invention, but an organosilane or its partially hydrolyzed condensate (component (D)) represented by the general formula (2)

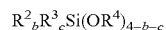

may also be added. This organosilane is adsorbed chemically and physically on the surface of a thermally conductive filler in the composition and is effective in maintaining thermal properties of the heat dissipating grease composition in high humidity environment since it improves the humidity resistance of a thermally conductive filler.

Here, $R^2$ is one or two or more groups selected from a group of substituted or unsubstituted monovalent alkyl groups containing six to twenty carbon atoms, and hexyl, octyl, decyl, dodecyl, tetradecyl, hexadecyl, octadecyl and the like groups, for example, may be mentioned. However, alkyl groups containing six to fourteen carbon atoms are particularly preferred. 'b' is an integer one to three, and one is particularly preferred. $R^3$ is one or two or more groups selected from a group of substituted or unsubstituted monovalent hydrocarbon groups containing one to twenty carbon atoms, and alkyl groups such as methyl, ethyl, propyl, hexyl, octyl, decyl, dodecyl, tetradecyl, hexadecyl, octadecyl and the like groups; cycloalkyl groups such as cyclopentyl, cyclohexyl and the like groups; alkenyl groups such as vinyl and allyl groups; aryl groups such as phenyl and tolyl groups; aralkyl groups such as 2-phenylethyl, 2-methyl-2-phenylethyl and the like groups; and halogenated hydrocarbons such as 3,3,3-trifluoropropyl, 2-(perfluorobutyl) ethyl, 2-(perfluorooctyl) ethyl, p-chlorophenyl and the like groups, for example, can be mentioned. However, methyl group is particularly preferred. $R^4$ is one or two or more groups selected from a group of monovalent alkyl groups containing one to six carbon atoms, and methyl, ethyl, propyl, butyl, pentyl and hexyl groups, for example, can be mentioned. However, methyl and ethyl groups are particularly preferred. 'c' is an integer zero to two, and 'b+c' is an integer one to three.

The content of the organosilane mentioned above is 0.1 part to 10 parts by weight per a total of 100 parts by weight of said components (A), (B) and (C). When the content is lower than 0.1 part by weight, the water resistance of the thermally conductive filler declines. A content exceeding 10 parts by weight is uneconomical due to a saturation effect.

A heat dissipating silicone grease of the present invention can be manufactured by mixing components (A), (B) and (C) described above and also, when necessary, component (D) using a designated mixer. As such a mixer, Trimix, Twinmix, Planetary Mixers (all made by Inoue Seisakusho Co.), Ultramixer (a blender manufactured by Mizuho Kogyo Co.) and Hivis Disper mix (a blender manufactured by Tokushu Kika Kogyo Co.) can ideally be used.

A heat dissipating silicone grease having excellent thermal conductivity and coating properties can be obtained using the present invention. The heat dissipating silicone grease can be applied particularly readily and accurately (uniformly thinly) even when it is applied on a large area, such as is the case with heat sinks, using a printing process using a metal screen and the like.

EXAMPLES

The present invention is explained in further detail by presenting specific examples below, but the present invention is not limited to the examples.

Example 1

200 grams of an organo polysiloxane (dynamic viscosity 390 mm²/sec and henceforth referred to as "organo polysiloxane-1") shown by the general formula,

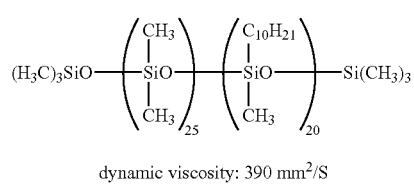

dynamic viscosity: 390 mm²/S as component (A),
2,100 g of aluminum powder (an amorphous material having an average particle size of 7 μm) and 600 g of two types of zinc oxide powder (JIS specification, Mitsui Kinzoku Kogyo Corporation., an amorphous material having an average particle size of 0.3 μm) as component (B),
60 g of Isosol 400 (isoparaffin type solvent having a boiling point of 210° C. to 254° C., produced by Nippon Sekiyu Kagaku Corporation) as component (C), and 20 g of organosilane-1 ($C_{10}H_{21}Si(OCH_3)_3$) as component (D) were added to a five liter capacity Planetary Mixer (a blender manufactured by Inoue Seisakusho Corporation.) and were mixed for an hour at room temperature to manufacture a heat dissipating silicone grease composition.

Example 2

A heat dissipating silicone grease composition was prepared in a manner identical to the procedure according to Example 1 with the exception that 260 g of organo polysiloxane-1 as component (A), 30 g of Isosol 400 as component (C) and 10 g of organosilane-1 as component (D) were used.

Example 3

A heat dissipating silicone grease composition was prepared in a manner identical to the procedure according to Example 1 with the exception that 390 g of organo polysiloxane-1 as component (A), 2610 g of the two types of zinc oxide powder described above without using the aluminum powder mentioned above as component (B), 20 g of Isosol 400 as component (C) and no component (D) were used.

Example 4

A heat dissipating silicone grease composition was prepared in a manner identical to the procedure according to Example 1 with the exception that 240 g of organo polysiloxane-1 as component (A), 600 g of the two types of zinc oxide powder described above as well as 2,200 g of alumina powder (AO-502 produced by ADMATECHS Co., Ltd, containing spherical particles having an average particle size of 0.6 μm) without using the aluminum powder described above as component (B), 30 g of Isosol 400 as component (C) and no component (D) were used.

Example 5

A heat dissipating silicone grease composition was prepared in a manner identical to the procedure according to Example 1 with the exception that 200 g of the organo polysiloxane shown by the general formula

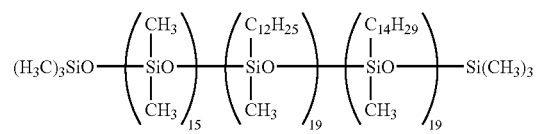

dynamic viscosity: 500 mm²/S (dynamic viscosity 500 mm²/sec and henceforth referred to as "organo polysiloxane-2") was used as component (A) in place of organo polysiloxane-1, and 2,800 g of the alumina powder described above as component (B), 20 g of Isosol 400 as component (C) and no component (D) were used.

Comparative Example 1

A heat dissipating silicone grease composition was prepared in a manner identical to the procedure according to Example 1 with the exception that the amount of Isosol 400 used as component (C) was changed to 2 g.

Comparative Example 2

A heat dissipating silicone grease composition was prepared in a manner identical to the procedure according to Example 1 with the exception that the amount of Isosol 400 used as component (C) was changed to 400 g.

Comparative Example 3

A heat dissipating silicone grease composition was prepared in a manner identical to the procedure according to Example 1 with the exception that the amount of component (A) was changed to 80 g and no component (D) was added.

Comparative Example 4

A heat dissipating silicone grease composition was prepared in a manner identical to the procedure according to Example 1 with the exception that the amount of component (A) was changed to 1,300 g and no component (D) was added.

(Evaluations)

The following evaluations were conducted on the compositions obtained in the examples and comparative examples.

[Coating Properties Evaluation]

Three centimeter squares of a stainless steel sheet (120 μm thick) for metal screens were prepared, and individual heat dissipating silicone grease compositions were applied on a heat sink using a squeegee. The coated surface was allowed to dry for 30 minutes at 60° C. to evaporate the solvent. The coating qualities were evaluated according to the standards shown below.

O: A uniform coating was applied over the entire surface of heat sink.

Δ: The grease surface applied to the heat sink was slightly uneven.

X: The grease adhered to the squeegee and could not be applied.

[The Thermal Conductivity Evaluation]

A Quick thermal conductivity meter, QTM-500 (manufactured by Kyoto Electronics Manufacturing Co), was used, and the thermal conductivity of individual silicone grease compositions at 25° C. were measured.

[Thermal Resistance Evaluation]

Standard aluminum plates were coated with a 120 μm thick coatings of individual heat dissipating silicone grease compositions applied using a metal screen. Next, the coatings were dried for 30 minutes at 60° C. Furthermore, separate standard aluminum plates were mounted on the surfaces coated with the individual heat dissipating silicone grease compositions mentioned above, and sample specimens for measurements containing heat dissipating silicone grease compositions 40 μm thickness were prepared by pressing the heat dissipating silicone grease compositions between the two sheets of standard aluminum plates.

For comparison, samples were obtained by eliminating the drying step after the applications and were used as comparative samples.

The thermal resistances of individual samples were measured using a thermal resistance meter (MicroFlash manufactured by Holometrix Micromet Inc.).

[Viscosity Evaluation]

The viscosities of individual heat dissipating silicone grease compositions at 25° C. were measured using a Malcom Viscometer (Type PC-1T, spiral viscometer manufactured by Malcom Co., Ltd ).

The compositions of individual heat dissipating silicone grease compositions and their evaluation results are shown in Table 1.

TABLE 1

| | | Compound | Example 1 | Example 2 | Example 3 | Example 4 | Example 5 | Comp. Example 1 | Comp. Example 2 | Comp. Example 3 | Comp. Example 4 |
|---|---|---|---|---|---|---|---|---|---|---|---|
| Comp. | Component A(g) | Organo polysiloxane 1 | 200 | 260 | 390 | 240 | — | 200 | 200 | 80 | 1300 |
| | | Organo polysiloxane 2 | — | — | — | — | 200 | — | — | — | — |
| | Component B(g) | Aluminum powder | 2100 | 2100 | — | — | — | 2100 | 2100 | 2100 | 2100 |
| | | Two types of zinc oxide powder | 600 | 600 | 2610 | 600 | — | 600 | 600 | 600 | 600 |
| | | Alumina powder | — | — | — | 2200 | 2800 | — | — | — | — |
| | Component C(g) | Isozol 400 | 60 | 30 | 20 | 30 | 20 | 2 | 400 | 60 | 60 |
| | Component D(g) | Organosilane - 1 | 20 | 10 | — | — | — | 20 | 20 | — | — |
| Eval. | Viscosity (Pa · S) | | 170 | 180 | 150 | 150 | 120 | 600 | Separated | Did not form a grease | 20 |
| | Thermal Conductivity (W/(m · K)) | Before evaporating the solvent | 4.0 | 3.7 | 2.5 | 2.7 | 2.9 | 5.9 | | | 0.4 |
| | | After evaporating the solvent | 6.0 | 4.6 | 2.9 | 3.2 | 3.5 | 6.0 | | | 0.5 |
| | Thermal resistance (mm² · K/W) | Before evaporating the solvent | 15 | 16 | 27 | 24 | 23 | Could not be measured | | | 130 |
| | | After evaporating the solvent | 9 | 12 | 19 | 17 | 16 | | | | 110 |
| | Coating properties | | o | o | o | o | o | x | | | o |

As clearly indicated by the data in Table 1, the viscosity was suitable for the individual examples and coating properties during processing were also good. In addition, the thermal conductivity and thermal resistance values were also good. The thermal conductivity improved and thermal resistance reduced further from the value prior to solvent evaporation particularly when a solvent evaporation treatment was conducted.

In contrast, the viscosity value was extremely high, the coating properties declined and samples for evaluation could not be prepared when the content of component (C) solvent was less than 0.1% by weight as in Comparative Example 1. Therefore, the thermal resistance could not be measured. In addition, individual components separated, a composition could not be manufactured and evaluation could not be conducted when the content of component (C) solvent exceeded 10% by weight as in Comparative Example 2. The composition did not form a grease and could not be evaluated when the content of component (A) organo polysiloxane was less than 3% by weight as in Comparative Example 3. When the content of component (A) organo polysiloxane exceeded 30% by weight as in Comparative Example 4, the content of the thermally conductive filler decreased correspondingly and the thermal conductivity declined, and the thermal resistance rose.

The invention claimed is:

1. A heat dissipating silicone grease composition comprising:
    (A) 3% to 30% by weight of an organopolysiloxane of the formula:

$R^1_a SiO_{(4-a)/2}$ where $R^1$ is selected from saturated or unsaturated monovalent hydrocarbon groups containing one to eighteen carbon atoms, and a is a positive number defined by $1.8 \leq a \leq 2.2$,
    and where the organopolysiloxane has a dynamic viscosity at 25° C. of 50 mm²/s to 500,000 Mm²/s;
    (B) 60% to 96.9% by weight of a thermally conductive filler having a thermal conductivity of at least 10 W/(m·K); and
    (C) 0.1% to 10% by weight of an isoparaffin type solvent having a boiling point of 80° C. to 260° C. that disperses or dissolves said organopolysiloxane (A) and which is capable of being evaporated from the composition to provide the grease,
    wherein the composition is capable of being applied by a printing process.

2. The heat dissipating silicone grease composition according to claim 1 which further comprises:
    (D) 0.1 part to 10 parts by weight, based on a total of 100 parts by weight of said components (A), (B) and (C), of an organosilane or its partially hydrolyzed condensed material of the formula $R^2_b R^3_c Si(OR^4)_{4-b-c}$ where $R^2$ is selected from substituted or unsubstituted monovalent alkyl groups containing six to twenty carbon atoms, $R^3$ is selected from substituted or unsubstituted monovalent hydrocarbon groups containing one to twenty carbon atoms, $R^4$ is selected from monovalent alkyl groups containing one to six carbon atoms, b is an integer from one to three, c is an integer from zero to two and b + c is an integer from one to three.

3. A method of using the heat dissipating silicone grease composition of claim 1, which comprises: applying the heat dissipating silicone grease composition of claim 1 to the surface of a heat dissipating material using a printing process; and subsequently evaporating the solvent contained in the composition.

4. A method of using the heat dissipating silicone grease composition of claim 2, which comprises: applying the heat dissipating silicone grease composition of claim 2 to the surface of a heat dissipating material using a printing process; and subsequently evaporating the solvent contained in the composition.

5. The heat dissipating silicone grease composition according to claim 1 wherein $R^1$ is selected from: methyl, ethyl, propyl, hexyl, octyl, decyl, dodecyl, tetradecyl, hexadecyl, octadecyl, cyclopentyl, cyclohexyl, phenyl, tolyl, 2-phenylethyl, 2-methyl- 2-phenylethyl, 3,3,3-trifluoropropyl, 2-(perfluorobutyl)ethyl, 2-(perfluorooctyl)ethyl and p-chlorophenyl groups.

6. The heat dissipating silicone grease composition according to claim 1 wherein $R^1$ is selected from a methyl group, a phenyl group and alkyl groups containing six to fourteen carbon atoms.

7. The heat dissipating silicone grease composition according to claim 1, wherein a is a positive number defined by $1.9 \leq a \leq 2.2$.

8. The heat dissipating silicone grease composition according to claim 1, wherein the organopolysiloxane has a dynamic viscosity at 25° C. of 100 mm²/sec to 10,000 mm²/sec.

9. The heat dissipating silicone grease composition according to claim 1, wherein the composition contains 5% to 15% by weight of the organopolysiloxane based on the entire silicone grease composition.

10. The heat dissipating silicone grease composition according to claim 1, wherein the thermally conductive filler is selected from: aluminum powder, copper powder, silver powder, nickel powder, gold powder, alumina powder, zinc oxide powder, magnesium oxide powder, aluminum nitride powder, boron nitride powder, silicon nitride powder, diamond powder, carbon powder and mixtures thereof.

11. The heat dissipating silicone grease composition according to claim 10, wherein the thermally conductive filler has an average particle size of 0.1 μm to 100 μm.

12. The heat dissipating silicone grease composition according to claim 1, wherein the content of the thermally conductive filler is 80% to 95% by weight of the entire silicone grease composition.

13. The heat dissipating silicone grease composition according to claim 1, wherein the content of the isoparaffin type solvent is 0.5% to 5% by weight of the entire silicone grease composition.

14. The heat dissipating silicone grease composition according to claim 2, wherein $R^2$ is selected from alkyl groups containing six to fourteen carbon atoms, b is the integer one, $R^3$ is methyl, and $R^4$ is methyl or ethyl.

15. The heat dissipating silicone grease composition according to claim 2, which consists of components (A), (B), (C) and (D).

* * * * *